United States Patent

[11] 3,599,685

| [72] | Inventors | Henry Westergren;<br>Bertil Larsson, both of Kallhall, Sweden |
|---|---|---|
| [21] | Appl. No. | 691,389 |
| [22] | Filed | Dec. 18, 1967 |
| [45] | Patented | Aug. 17, 1971 |
| [73] | Assignee | Karlholms Aktiebolag<br>Stockholm, Sweden |
| [32] | Priority | Oct. 23, 1967 |
| [33] | | Sweden |
| [31] | | 14474/67 |

[54] UNIT AND METHOD FOR WOODWORKING
2 Claims, 12 Drawing Figs.

[52] U.S. Cl. .................................... 144/38, 144/124, 144/309 Z
[51] Int. Cl. .................................... B27c 9/00
[50] Field of Search .................................... 144/38, 125, 127, 124; 30/140

[56] References Cited
UNITED STATES PATENTS

| 257,564 | 5/1882 | Dunham | 144/124 |
| 399,758 | 3/1889 | Lawrence | 144/38 X |
| 3,087,269 | 4/1963 | Hudson | 144/309 X |
| 3,165,832 | 1/1965 | Stipcevich | 30/140 |

FOREIGN PATENTS

| 48,817 | 3/1921 | Sweden | 145/5 |
| 347,928 | 5/1931 | Great Britain | 144/38 |

Primary Examiner—Robert C. Riordon
Assistant Examiner—J. C. Peters
Attorney—Sommers & Young ABSTRACT: Apparatus for rounding or chamfering the edges of a multi-ply glued fiberboard material comprising a cutting tool and an associated means for heating the edge surface immediately after the edge has been processed by the cutting tool. The heating tool may be electrically heated or may comprise a roller rotating at high speed and adapted for frictional heating of the edge surface.

PATENTED AUG 17 1971 3,599,685

Inventors
Henry Westergren,
Bertil Larsson
by Sommers + Young
Attorneys

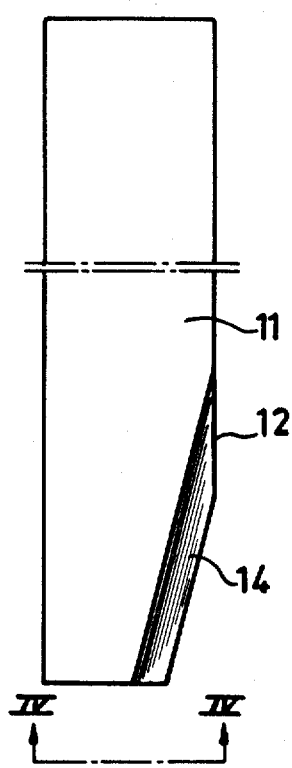
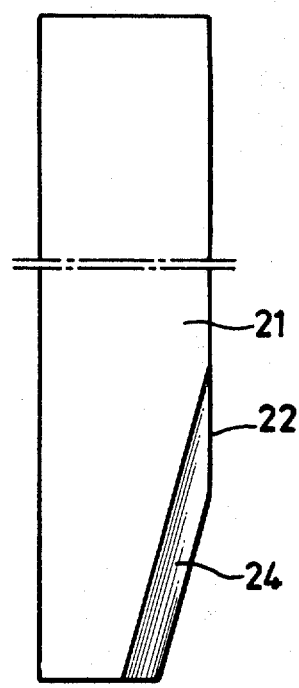
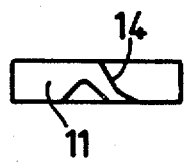

UNIT AND METHOD FOR WOODWORKING

This invention relates to a unit and a method for use in woodworking, more precisely an aftertreatment of formed wood fiber products.

The invention is specially adapted for glued constructions comprising fiberboards on both sides of a wood frame and a spacing material. Such constructions are usually applied in the manufacture of doors, kitchen joineries, clothes closets and the like. Usually, the construction is for closet sides and covers (doors), similar in principle. Also, bench tops are manufactured in a similar way. The kitchen joineries are delivered to the building site in untreated state or ready-painted, and in some cases one veneered. In Sweden, the trend is increasingly to the use of ready-painted joineries shipped directly from the factory.

The invention has a further application in the manufacture of doorcases, floor footings, and ceiling fillets made of fiberboards of 12 to 16 mm. thickness.

There are usually no greater problems involved when the kitchen joineries are delivered in untreated state. In such cases, the painters at the building site then usually must ensure a satisfactory final result. However in the manufacture of factory-painted joineries, the edge must be chamfered or rounded in a particularly tidy way, and a good economy in the treatment of these edges must be observed.

By applying working tools of known special type, fairly good results can be in achieved in chamfering or founding the edges. The edges, however requires a special painting treatment in relation to the major surface portion of the board material. This applies particularly to the new types of board which are manufactured in such a manner as to permit their being painted in one painting operation. The situation is the same in the manufacture and painting of, for example, door cases, floor footings, fillets and the like.

The invention, therefore, has as its object to render possible the finishing of treated surfaces, which results in a paintable surface of the same nature as the untreated surface. The characterizing features of the invention become evident from the following claims, and in the following embodiments which are disclosed in the accompanying drawings.

FIG. 8 shows a horizontal view of the cutter in FIG. 6.

FIG. 9 shows the cutter seen in the direction IV-IV in FIG. 8.

FIG. 10 shows another cutter having straight cutting edge.

FIGS. 5A—5D illustrate various examples of the manner in which multiply glued fiberboard materials may have their edges treated by the combined chamfering and edge processing tool of the present invention. Thus, FIGS. 5A—5D illustrate the various ways in which, for example, the edges of plywood kitchen doors may be chamfered and concurrently treated to permit their being painted so as to provide a smooth edge surface. The device of this invention may also be used, for example, in providing grooves in edges so as to permit the attachment of plastic strips or the like.

Figure 4:
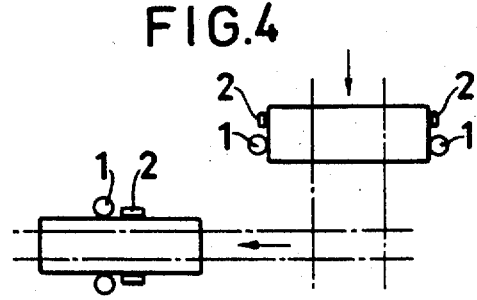
FIG. 4 shows a principle outline for placing the unit according to the invention.

FIG. 4 is a plan view illustrating the manner in which the edges of a panel may be treated by the apparatus of the present invention while the panel is fed by a conventional feed means past the device of the invention. Thus, the upper portion of FIG. 4 illustrates a conventional feed means 1 on both sides of the panel and rotating about vertical spindles and thereby propelling the panel to be treated past the two cutting and treating devices 2, and the lower portion of FIG. 4 shows a similar arrangement but with the spindles 1 and cutting and treating devices 2 disposed along the long edges of the panel to be treated and with movement of such panel occurring at right angles to that shown for the device in the upper portion of FIG. 4.

Figure 1:
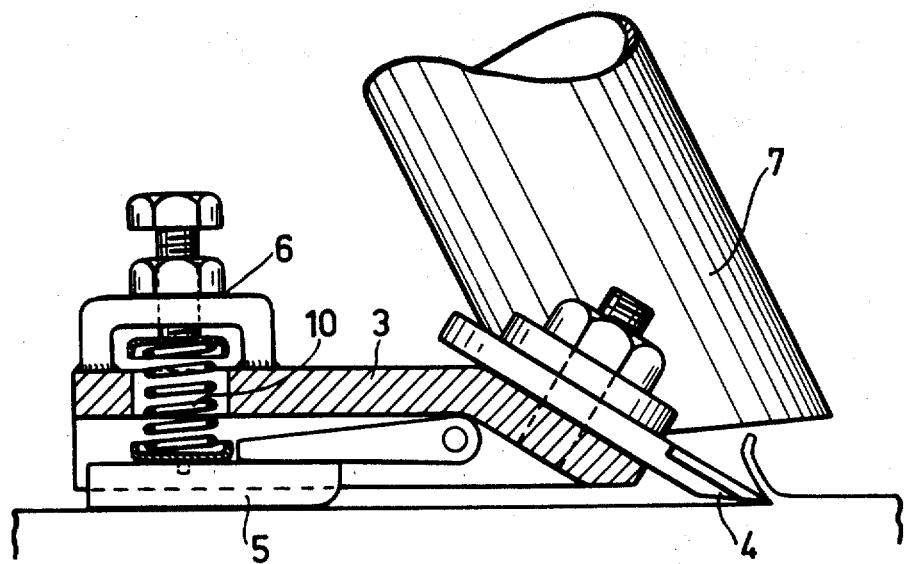
FIG. 1 shows partly a side view of a working tool with an aftertreatment arrangement according to the invention.
Figure 3:
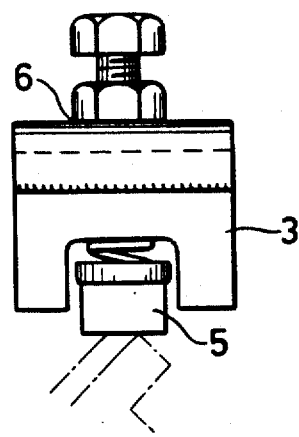
FIG. 3 shows the arrangement in FIG. 1 seen from the left-hand side.
Figure 2:
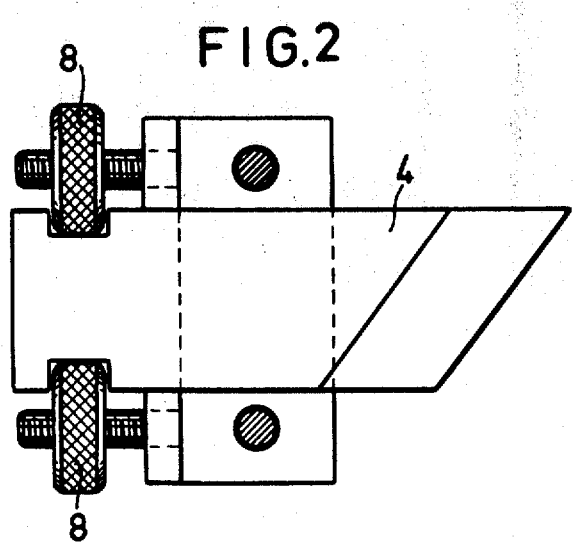
FIG. 2 shows in a horizontal view a smaller part of the tool according to FIG. 1.
Figure 5:
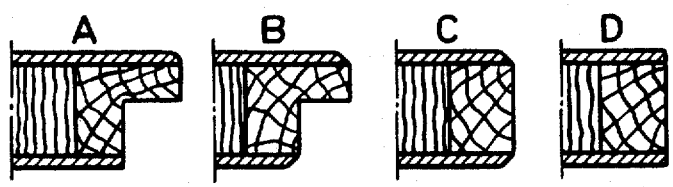
FIG. 5 shows in a cross section examples of edge appearances of, for example, kitchen doors.

FIGS. 1—3 illustrate a cutter 4 with a cemented carbide coat of, for example, quality K20 mounted firmly in a holder 3. The cutting edge of the cutter 4 must slope so that the cutting forces are directed from the plane surface inwardly to the construction. In this way, the lifetime of the tool can be extended substantially without producing upset board edges. The cutter 4 can be easily adjusted with the adjusting screws 8. Shavings are sucked up into a suction nozzle 7.

The U-shaped holder 3 includes a heating plate 5 which via a spring 10 and a chucking device 6 runs immediately behind the cutter. The heating plate is heated electrically to variable temperatures and is adapted to burn off fiber particles which usually rise in connection with, for example, painting. By increasing the temperature of the heating plate, the glueing effect of lignin used in the manufacture of fiber boards may be utilized to improve the surface being treated of such boards. This burned surface shows substantially the same paintability as the major surface portion of the board material. Under certain conditions it may be advantageous, in a suitable way (for example with a wick or roll) to apply, for example, a thermoplastic material for pretreating the surface for painting, in which case the temperature of the heating plate can be lowered. In the embodiment shown in FIG. 1, a separate heating plate 5 is arranged behind the cutter 4, but the burning may also be effected by a plane heated portion of the cutter.

Instead of a heating plate 5, and the cutter 4, a rapidly rotating friction rolls (not shown) may be used which produces the necessary temperature by friction heat and working due to abutment under pressure. The temperature required is about 500° C. For the working of, for example, floor footings, a feed speed of about 20—25 m./min. through the working machine requires a motor of about 8—10 HP on a 150 mm. friction roll for obtaining satisfactory results. The friction roll which is bright-polished rotates with a speed of 6000 r.p.m.

It may be mentioned that extremely good results of the combination of working and burning were achieved by using a rapidly rotating grinding wheel of, for example, a carborundum type. The problem, however, is that these wheels get clogged by fiber material depositing between the grains in the grinding wheel. The results change with different structure of the grinding wheel, but with a rotating roll of burnished steel no coats are produced on the friction roll.

The aforedescribed unit is completed with guiding and retaining arrangements.

Figure 6:
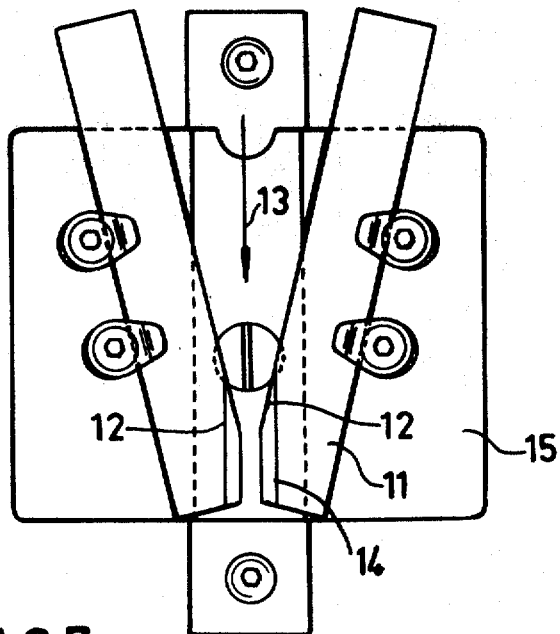
FIG. 6 shows the invention in another embodiment, provided with two cutters and seen from above.
Figure 7:
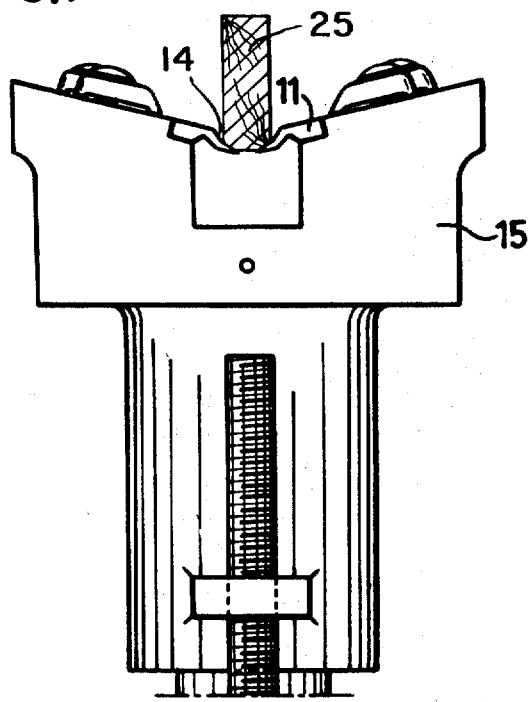
FIG. 7 shows a side view of the arrangement according to FIG. 6 seen against the feed direction.
Figure 11:
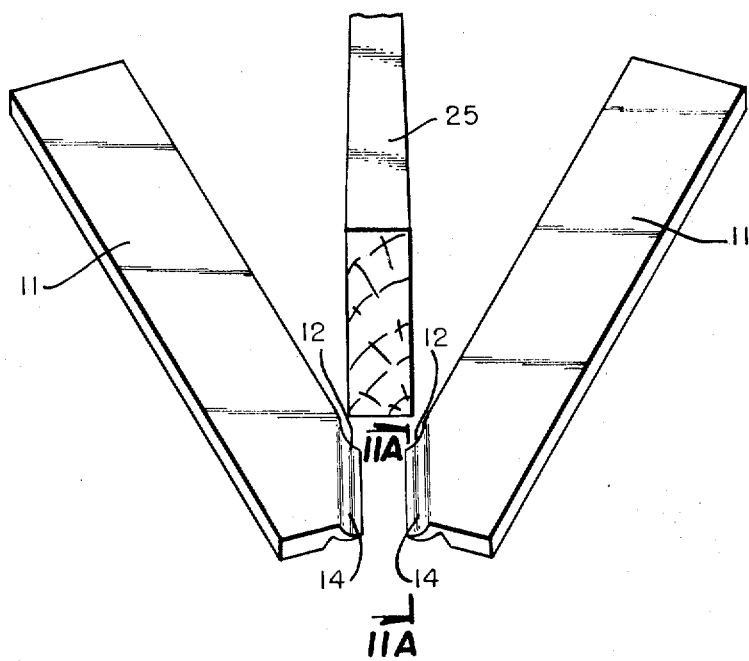
FIG. 11 is a perspective view of the cutters used in the embodiment of the invention shown in FIGS. 6—10.
Figure 11A:
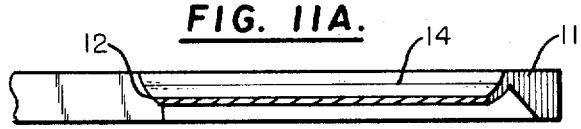
FIG. 11A is a sectional view taken along the section line 11A—11A of FIG. 11.

In FIGS. 6—10 another embodiment of the invention is shown. On The holder 15 two cutters 11 are detachably mounted. The arrow 13 indicates the feed direction of the wood blank 25 in the direction against the oblique cutting edges 12. Thus, the two cutters chamfer two edges of a wood blank advanced between the cutting edges 12. Each cutter 11 is mounted at an acute angle with the feed direction 13 and, thereby, with those edge lines of the wood blank which are to be chamfered. The contour line of the edges at the cutter in FIGS. 6 and 7 is curved along both its upper surface and its bottom surface. At the upper surface, the curved portion 14 joins with a flat portion along a straight line. As can be seen in FIG. 7, the curved portions 14 provide the edge-chamfering operation on the wood blank 25, and this portion of each cutter 11 is of thin cross section as compared to the rest of the cutter with the result that the heat produced by friction in each cutter 11 is conducted away only slowly. As a result, each cutter 11 becomes quite hot at its surface 14, and this heat is transferred to the wood blank 25 and is effective to burn off or bend over into the wood surface any wood fibers. The surface 14 extends forwardly in the feed direction from the cutting edge 12, and such surface 14 abuts the chamfered surface of the workpiece as it is being advanced relative to cutting tool 11. The perspective view of FIG. 11 and the side view of the right-hand cutter of FIG. 6 as shown in cross section in FIG. 11A clearly illustrate the curved cutting edge 12 on tool 11 and also the curved surface 14 which bears with pressured contact against the chamfered edge of the workpiece. The heat, therefore, is transferred to the wood blank, and raised fibers are burnt off or bent over into the wood blank surface and fastened by the lignin substance.

FIG. 8 shows a horizontal view of the cutter of FIGS. 6 and 7. The cutting edges are designated by 12 and the burning surface by 14.

FIG. 9 shows the cutter seen in the direction of the arrows IV-IV and, thus, against the direction in which the blank is advanced. The shape of the surface 14 appears from the Figure, and is slightly concave with a marked break.

FIG. 10 shows a cutter 21 which has a plane burning surface 24. The cutting edges are designated by 22.

By chamfering or rounding the edges of joineries in this novel way, a multifold number of running-meters can be worked with substantially better result than in the traditional way.

What we claim:

1. Apparatus for chamfering the edge of a plywood panel or the like comprising the workpiece, the apparatus including in combination, a detachably mounted fixed cutting element for both chamfering the edge of the workpiece and for rendering smooth and readily paintable the chamfered edge of the workpiece as the workpiece is driven past said cutter element, said cutting element having a first longitudinally extending edge which lies parallel to the direction of feed of the workpiece, said cutting element further having a second edge which angles at an acute angle inwardly to the workpiece in the direction of feed of the workpiece, said second edge at its junction with said first edge forming a sharp cutting edge which faces the workpiece as it is driven past said cutting element, said cutting edge in cross section a curved surface which is contoured to correspond to the desired contour of the surface to be chamfered, said longitudinally extending first edge having over its length the same curved surface in cross section as said cutting edge so as to bear with pressured contact against the chamfered surface of the workpiece as such chamfered surface moves past said cutting edge, said first edge being sufficiently thin in cross section over its length at least adjacent said curved portion so as to become heated by the friction of the workpiece bearing thereagainst to thereby burn off or bend into the edge of the workpiece any fibers raised during the chamfering operation.

2. The tool of claim 1 which includes a second cutter element mounted directly opposite the first-mentioned cutter element in said holder.